June 3, 1930.  T. P. LITTLE  1,760,875
MANDREL DELIVERING APPARATUS
Filed July 12, 1927   2 Sheets-Sheet 1
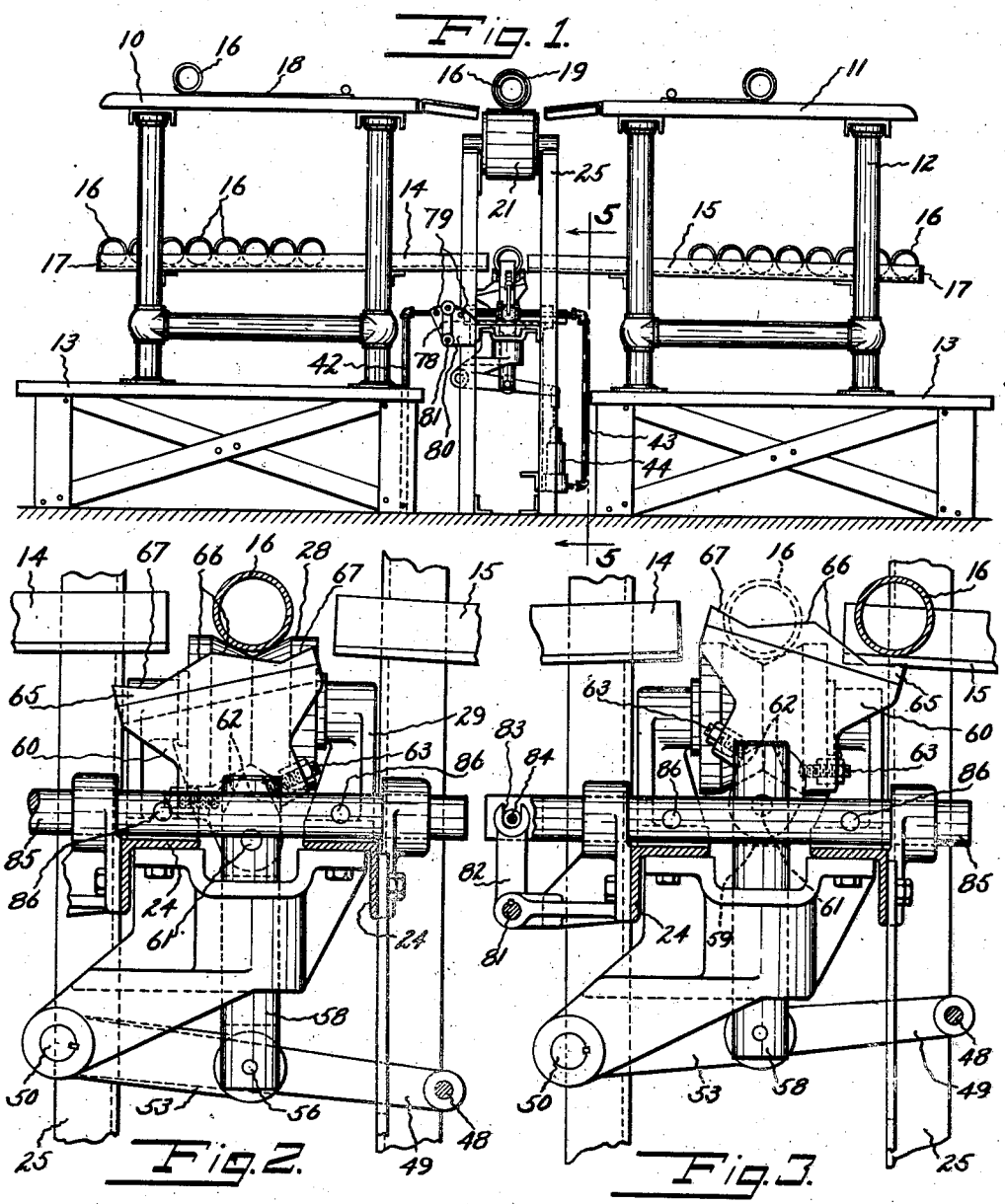
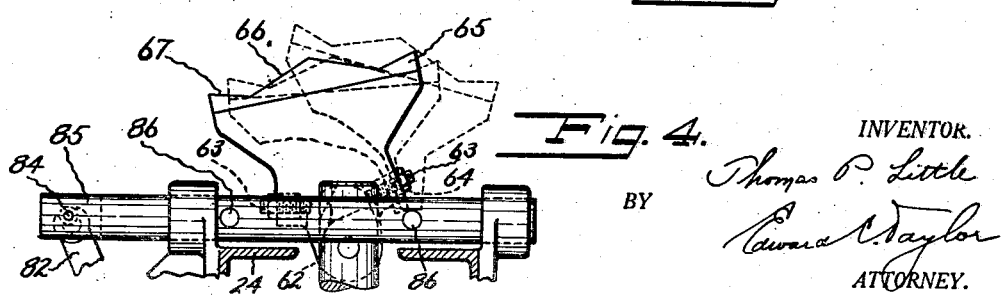
INVENTOR.
Thomas P. Little
BY
Edward N. Taylor
ATTORNEY.

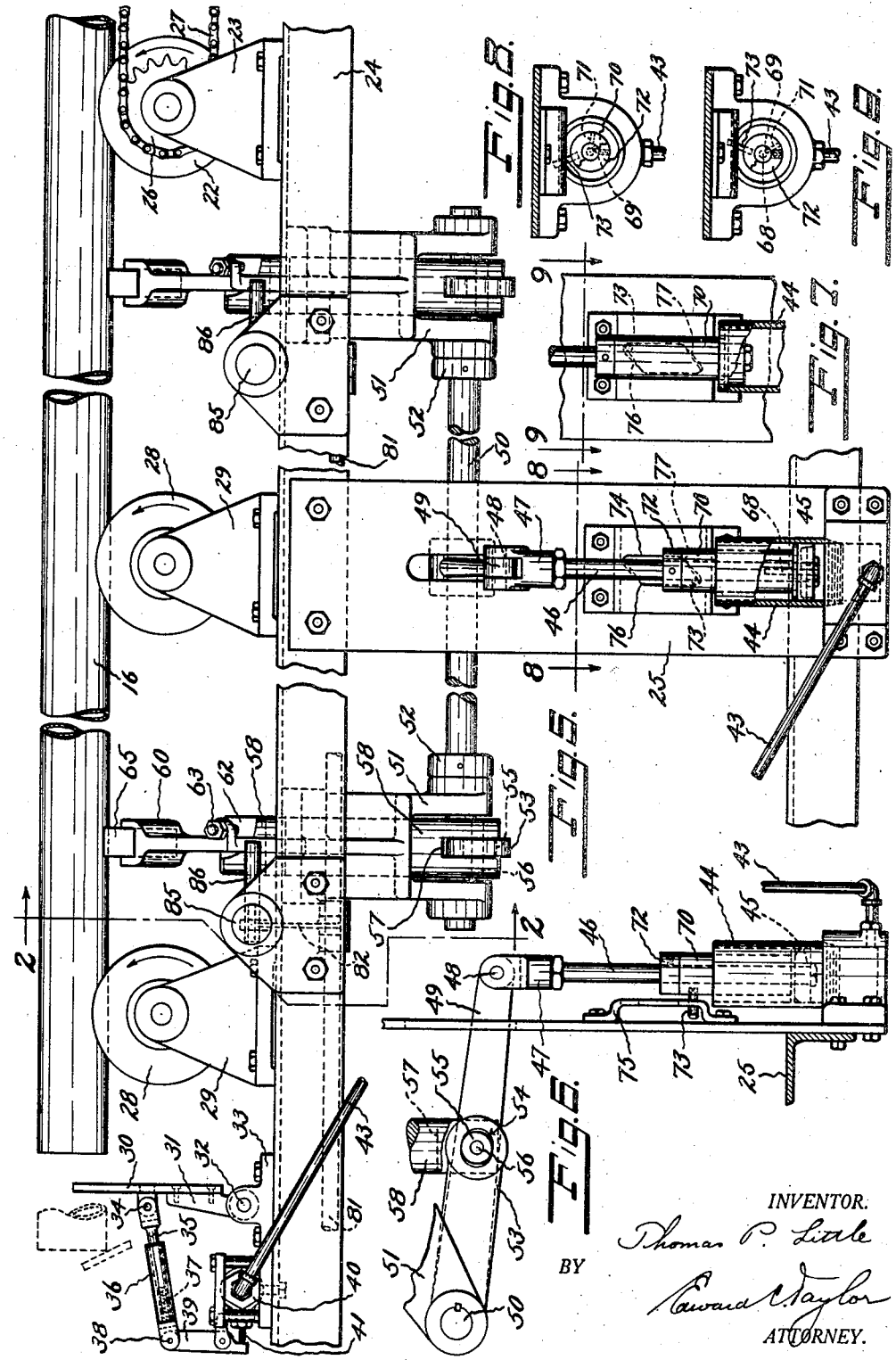

Patented June 3, 1930

1,760,875

UNITED STATES PATENT OFFICE

THOMAS P. LITTLE, OF CHICOPEE FALLS, MASSACHUSETTS, ASSIGNOR TO THE FISK RUBBER COMPANY, OF CHICOPEE FALLS, MASSACHUSETTS, A CORPORATION OF MASSACHUSETTS

MANDREL-DELIVERING APPARATUS

Application filed July 12, 1927. Serial No. 205,085.

This invention relates to apparatus for handling and delivering mandrels such as are used in the manufacture of rubber inner tubes. The particular object of the invention is to provide an apparatus of this general character which will deliver a constant supply of mandrels coming from a single source to two separate stations, either alternately to one and the other station, or constantly to either station as may be desired by the operator.

Referring to the drawings:

Fig. 1 is an end elevation of an apparatus constructed in accordance with my invention;

Fig. 2 is a section on line 2—2 of Fig. 5 showing a tube about to be ejected to the right as viewed in Fig. 2;

Fig. 3 is a similar view showing the completion of the ejection of the mandrel;

Fig. 4 is a detail showing the operation of the devices for causing the ejection of the mandrel to occur always to the same side of the machine;

Fig. 5 is a section on line 5—5 of Fig. 1;

Fig. 6 is a side elevation of certain parts shown in Fig. 5;

Fig. 7 is a detail of certain parts shown in Fig. 5 in a different position of operation;

Fig. 8 is a section on line 8—8 of Fig. 5; and

Fig. 9 is a section on line 9—9 of Fig. 7.

The present mechanism is designed to supply mandrels alternately to two tube rolling tables shown in Fig. 1 at 10 and 11. These tables are supported upon standards 12 resting for convenience on platforms 13 upon which the tube rolling operators stand. Supported upon the standards 12 are runways 14 and 15 which slope downwardly in opposite direction from the center of the machine. These runways are conveniently constructed of angle iron and support the ends of the mandrels 16, causing the mandrels to roll down until they are stopped by abutments 17 at the end of the runways, or by another mandrel. The rolling operators remove the mandrel adjacent the abutment 17 from the trackway 14 or 15 adjacent to which they are standing and place the mandrel upon a sheet of rubber 18 which has been located upon the tube rolling table. The mandrel is then rolled over the rubber causing the rubber to be wrapped around the mandrel to form a tube 19. The tube with the mandrel inside then slides down one of the two inclines 20 onto a conveyor 21, which may be driven by any suitable source of power and which carries the tube to a point where further operations are performed upon it.

After the treatment of the tubes upon the mandrels has been completed the tubes are removed and the mandrels placed upon a conveyor serving to return them to the rolling tables. This conveyor in the present instance is shown as being composed of rolls 22, of which only one is shown in the drawing, mounted in bearing blocks 23 upon angle irons 24 forming part of a framework 25 which also supports the conveyor 21. Each of the rolls 22 is provided with a sprocket 26 driven by a chain 27 to give the rolls a constant rotation in the direction of the arrow in Fig. 5. Positioned beyond the rolls 22 are idle rolls 28 mounted upon bearing blocks 29 likewise secured to the angle iron 24. Both the rolls 22 and the rolls 28 are preferably made with a concave surface, as best shown in Fig. 2, in order to prevent the mandrels rolling off and to hold them in a central position.

As a mandrel proceeds along the rolls it ultimately strikes a plate 30 fastened to an arm 31 pivoted at 32 to a bearing block 33 carried upon the angle iron 24. Pivoted at 34 to the plate is a rod 35 running in a cylinder 36 and urged outwardly of the cylinder by a spring 37. The cylinder 36 is pivoted at 38 to the operating lever 39 of a valve 40, preferably formed of the plunger type, having an outwardly spring-pressed pin 41 against which the operating lever presses when the plate 30 is forced to the left or dotted line position in Fig. 5. The valve is connected to an inlet pipe 42 leading from a suitable source of compressed air and to an outlet pipe 43 leading to a pneumatic cylinder 44. This pneumatic cylinder 44 is formed with an open top and has fitted therein a piston 45 secured to a piston rod 46. The upper end of this rod is formed with a yoke 47 pivoted at 48 to an arm 49 projecting from a shaft 50. This shaft is mounted in brackets 51 upon the angle iron 24 and is held against longitudinal movement by collars 52. Likewise secured to the shaft 50 are two arms 53 each having a slot 54 adjacent one end in which fits a roll 55 secured by a pin 56 in the slotted end 57 of a cylindrical slide 58. Each of these cylindrical slides is fitted to run in one of the brackets 51 previously referred to.

Referring particularly to Figs. 2 and 3, the upper end of each of the cylindrical slides 58 is provided with a slot 59 in which a rocker 60 is pivoted as at 61. The upper side portion of the slides is flattened off as at 62 to provide ledges against which stop screws 63 may abut. These screws are secured to the rocker by lock nuts 64 and serve to limit the amount of sideways rocking which the rocker possesses. Each of these rockers is provided with a top portion 65 which is preferably made of rubber or other yielding material in order to avoid any danger of marring the mandrels. These rubber tops are formed with oppositely slanting center portions 66 and with upwardly slanting side portions 67 as clearly shown in Figs. 2 and 3.

When the slides 58 are raised the rockers lie under the mandrels 16 and may be assumed to be in the position of Fig. 2, wherein they are tilted to the left as far as it is possible for them to go. As the rockers rise the mandrel is picked up off the rolls 28 and rolled down the incline 66 to the right as viewed in Fig. 2. When the rolling mandrel strikes the upwardly slanting portion 67 its momentum, as well as the fact that in this position it shifts the center of gravity of the rocker to the right of the pivot 61, causes the rocker to swing over to the right as indicated in Fig. 3. This discharges the mandrel onto the runway 15 as clearly shown in Fig. 3. As the slides again descend the rockers 60 remain in their right-hand position until a succeeding mandrel is picked up. On the next travel upwardly of the slide the mandrel is received on the left-hand slanting portion 66 and instead of being rolled to the right, as was previously the case, it is caused to roll to the left and is discharged onto the runway 14.

In order to cause the slide 58 to descend after the mandrel has been discharged the following mechanism is provided. The piston rod 46 is provided with a longitudinal hole 68 opening into the pneumatic chamber bounded by the cylinder 44, its closed bottom end, and the piston 45. Leading into this longitudinal hole are radial holes 69. Normally these holes are closed by a sleeve 70 which, however, has holes 71 in it aligning with the radial holes in the piston rod when the sleeve is properly rotated. When this alignment of holes does occur it furnishes a vent from the pneumatic chamber previously mentioned into the portion of the cylinder 44 above the piston. As previously stated, the cylinder has an open top, and by this arrangement when the slide is rotated into a position to cause alignment of the holes the pneumatic cylinder is vented and the piston permitted to descend. The mandrel having been removed from the rolls 28 has likewise been removed from contact with the plate 30 which, by the force of the spring in the valve 40, moves to the position shown in full line in Fig. 5. This cuts off the supply of air to the bottom of the cylinder so that the piston with the parts controlled thereby gradually descends as the air passes out through the vent.

The sleeve 70 is provided with a pin 73 which runs in a cam slot 74 cut in a strap 75 secured to the frame 25. This cam slot has a slanting top 76 and a slanting bottom 77. When the apparatus is at rest the pin lies at the lower left-hand corner of the groove as viewed in Fig. 5. As the piston rises under the influence of compressed air admitted through valve 40 the pin 73 remains at the left of the slot until the piston nears the upper limit of its travel. At this point the pin contacts with the slanting upper surface 76 of the cam slot and is is moved to the position of Fig. 7, rotating the sleeve and causing the holes 69 and 71 to come into alignment as shown in Fig. 9. As the piston descends the vent is held open until the pin 73 contacts with the bottom portion 77 of the groove, when the parts are returned into the normal position shown in Fig. 8.

The mechanism above described will cause discharge of the mandrels from the rolls 28 alternately upon the runways 14 and 15. In case one of the rolling tables 10 and 11 is not in use, however, it may be desirable to cause all of the mandrels to pass down a particular runway. Mechanism has therefore been provided by which the operator may control the direction in which the mandrels are discharged. For this purpose a handle 78 provided with means engaging stop holes 79 in a plate 80 is fastened to a shaft 81 as shown in Fig. 1. At points on this shaft adjacent the two slides 58 arms 82 are secured. Each of these arms has a slotted end 83 into which fits a pin 84 mounted upon a rod 85 sliding transversely through the machine. Each of these rods carry pins 86 which normally are spaced symmetrically and in a position in which they do not contact with the rocker 60. In Fig. 4 the rod 85 has been shown as shifted to the left. This brings the right-hand pin 86 in a position to underlie shoulders 87 formed on the rocker when the rocker is in its lowermost position. Assuming that the rod 85 is left in this position, starting with the parts in the position of Fig. 2, a similar cycle to that already described will be carried on up to the point where the slide 58 and the rocker descend from the position of Fig. 3. At that time, however, the shoulder 87 on the rocker will contact with the right-hand pin 86 causing the rocker to return to the position of Fig. 2. Thus, when the rod 85 is in the position of Fig. 4 the rocker will always start its upward movement from the left-hand position and will therefore always discharge mandrels onto the runway 15. If the rod 85 is pushed to the right in Fig. 4 so that the left-hand pin 86 becomes operative all of the mandrels will be discharged upon the left-hand runway 14.

The mechanism described operates automatically upon the mandrels delivered by the conveyor rollers 22 and 28 at any speed at which the mandrels may be delivered. Since the mechanism is operated by the mandrels themselves these do not have to be supplied in timed relation. In actual operation the discharge of the mandrels is practically instantaneous and one mandrel is well out of the way before the next one approaches. Various changes in the mechanical structure of the parts may be made as desired for purposes of design without departing from the spirit of the invention as defined in the appended claims.

Having thus described my invention, I claim:

1. A mandrel handling apparatus comprising conveying means for feeding mandrels longitudinally, vertically movable slides underneath the path of the mandrels, rockers pivoted to said slides, each rocker having a double slanted central upper surface and upwardly slanted edges, means for moving the slides, and means for returning the rockers to their initial position after they have ejected a mandrel.

2. A mandrel handling apparatus comprising conveying means for feeding mandrels longitudinally, vertically movable slides underneath the path of the mandrels, rockers pivoted to said slides, each rocker having a double slanted central upper surface and upwardly slanted edges, and means for moving the slides.

3. A mandrel handling means including means for elevating the mandrels, said elevating means comprising a pivoted member having a mandrel receiving seat so positioned on each side of the pivot that said member will be overbalanced by a mandrel and thereby discharge the mandrel to one side of the elevating means and means to limit the pivotal movement of said member so that upon delivery of a mandrel from one seat the other seat will be left in position to receive the succeeding mandrel to overbalance the member toward the other side of the elevating means.

4. A device as in claim 3, including means to selectively return the pivoted member to its initial position with reference to its pivot after each discharge so that the same mandrel receiving seat is presented to succeeding mandrels.

THOMAS P. LITTLE.